Feb. 28, 1928.
T. N. GARSON
1,660,551
BRAKE AND CLUTCH MECHANISM
Filed Jan. 19, 1927
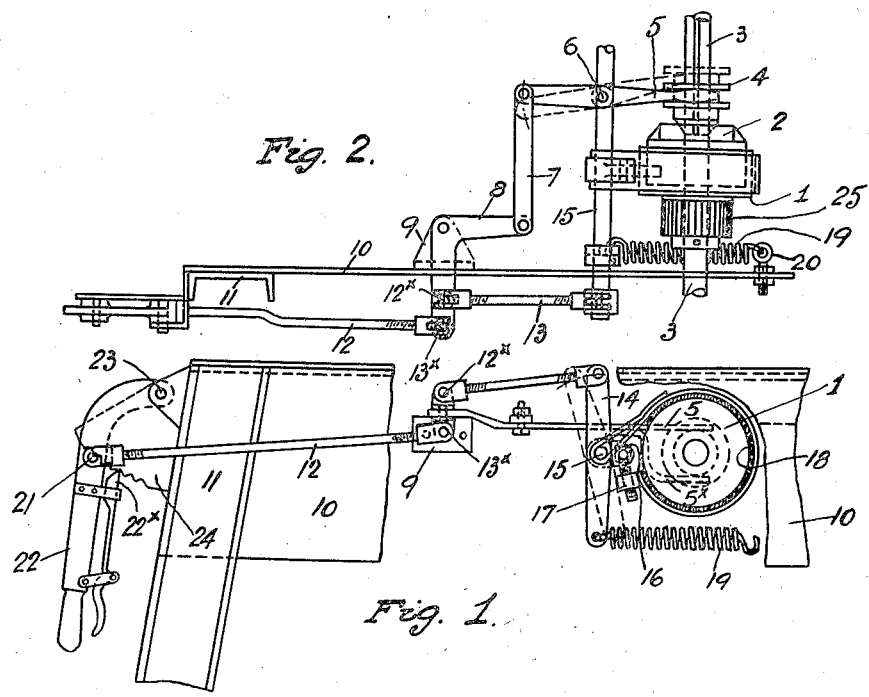

Patented Feb. 28, 1928.

1,660,551

UNITED STATES PATENT OFFICE.

THORVALD N. GARSON, OF NEW BRIGHTON, NEW YORK.

BRAKE AND CLUTCH MECHANISM.

Application filed January 19, 1927. Serial No. 162,026.

The object of the present invention is to provide brake and clutch mechanism of a class particularly adapted for application to a hoisting device mechanism such as that described in my pending application filed February 20, 1926, Serial No. 89,530, the construction being such that when the clutch is thrown into neutral position, means are employed to throw the brake into operative position, and when the clutch is thrown into engaging position, means for actuating the brake is placed in position for immediate operation when released.

The invention will be understood by reference to the accompanying drawings, in which—

Figure 1 is a side elevation of an embodiment of the invention, together with certain supporting members, the latter being partly broken away, and Figure 2 is a plan view of the same.

In the embodiment of the invention illustrated in the drawings, the clutch comprises an external clutch member 1 and an internal expanding clutch member 2, the latter being of any suitable construction and therefore being shown entirely diagrammatically in the drawing. Two members of the clutch are shown as mounted upon a shaft 3, the external member being loosely mounted. Internal expanding clutch member has in advance thereof a channel collar 4 which is keyed to shaft 3, and the end of a lever 5 is seated in the channel, the lever having a lower extension 5$^x$, the two forming a fork. The lever is pivoted at 6 and is connected by means of link 7 with a bell-crank 8, the latter being pivoted on a bracket 9 carried by a suitable supporting frame, horizontal and vertical frame members being indicated at 10 and 11.

The outer end of bell-crank 8 is adjustably connected to a rod 12 so that movement of rod 12 in reverse directions will operate the bell-crank in like directions and will move the internal expanding clutch member 2 into and out of operative engagement with the external clutch member 1.

Bell-crank 8 is also connected by an adjustable link 13 with the upper end of an arm 14 fixed upon a rock-shaft 15, which shaft has fixed thereto a short brake lever 16 which is adjustably connected at 17 with a brake band 18 surrounding the external clutch member 1, the opposite end of the brake band being strapped to shaft 15.

To the lower end of arm 14 is applied a spiral spring 19 which is placed under tension and is connected at 20 to the frame member 10. The spring acts to normally maintain brake lever 16 in operative or braking relation to the clutch, and also to maintain the clutch members disengaged.

Rod 12 is connected at 21 to a hand lever 22 pivoted at 23 upon a frame member. Hand lever 22 may be provided with a pawl 22$^x$ adapted for engagement with a ratchet member 24, the two acting as a latch to hold the lever in various positions within its range of movement.

The operation of the device is as follows:—

Assuming that the clutch is connected in any suitable way, as by gear 25 with a drum or other member to be driven, and the parts are in neutral position, spring 19 by its tension so holds the parts disengaged that shaft 3 may rotate idly. When clutch operating lever 22 is moved inwardly, the parts assume the position shown in full lines, Figure 2, the clutch members being engaged and the brake being released. Such movement of the clutch operating lever is effected against the tension of spring 19. It will therefore be seen that the lever must be latched in position in order to maintain the clutch in action. When, however, the operating lever is unlatched, spring 19 quickly acts to set the brake and to assist in the disengagement of the clutch members, the two actions being simultaneously effected.

The connections intermediate bell-crank 8 and links 12 and 13 are preferably in the nature of universal joints, as at 12$^x$ and 13$^x$, so as to compensate for the slight arcuate movement of the outer end of the bell-crank at such connections.

Having described my invention what I claim and desire to secure by Letters Patent is as follows:—

In combination, a power device including a shaft, complementary clutch members one being driven directly by the shaft and the second being adapted for interengagement with the first for receiving a driving movement therefrom, a brake band engaging the driven clutch member, a brake shaft, a lever on said shaft adapted to actuate the brake band, a clutch throw-out lever pivotally mounted on the brake shaft, a bell-crank, means for manually actuating the bell-crank and connections between the bell-crank, the clutch-throw-out lever and the brake shaft whereby the latter may be rotated and the clutch lever pivotally rocked by a movement of the bell-crank.

In testimony whereof, I have signed my name to this specification.

THORVALD N. GARSON.